Figure 5:
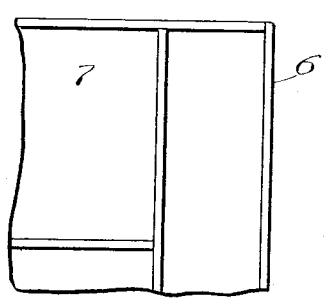

C. R. MURRAY, L. R. BRINK & W. K. MALMSTROM.
PROCESS OF ELECTRIC WELDING.
APPLICATION FILED APR. 15, 1912.

1,062,571. Patented May 20, 1913.

Witnesses
O. M. Nimich
A. L. Jones

Inventors
Lewis R. Brink
Charles R. Murray
Walter K. Malmstrom
by A. Miller Belfield, Atty.

UNITED STATES PATENT OFFICE.

CHARLES R. MURRAY, LEWIS R. BRINK, AND WALTER K. MALMSTROM, OF CHICAGO, ILLINOIS, ASSIGNORS TO BARNHART BROS. & SPINDLER, OF CHICAGO, ILLINOIS, A CORPORATION OF ILLINOIS.

PROCESS OF ELECTRIC WELDING.

1,062,571.     Specification of Letters Patent.     Patented May 20, 1913.

Application filed April 15, 1912. Serial No. 691,017.

*To all whom it may concern:*

Be it known that we, CHARLES R. MURRAY, LEWIS R. BRINK, and WALTER K. MALMSTROM, citizens of the United States, residing at Chicago, in the county of Cook and State of Illinois, have invented a certain new and useful Improvement in Processes of Electric Welding, of which the following is a full, clear, concise, and exact description, reference being had to the accompanying drawings, forming a part of this specification.

Our invention relates to an improved process of electric welding and has as its principal object the provision of a method whereby a piece of metal may be welded to another piece having a greater cross section than the first.

As is well known to those engaged in the art of welding metals, whether by electric or other means, it has heretofore been considered impossible to weld a given piece of metal to one having a materially larger or different cross section. The reason for this opinion in the trade was that when two pieces of metal were to be welded having a different cross section, the smaller piece carrying a greater current for unit area of cross section would become heated to the welding point before the piece of larger cross section. Consequently the smaller piece would become deformed under the pressure employed if the current were kept on long enough to raise the larger piece to welding temperature. This difficulty was all the greater in case it was desired to weld a thin strip to the face of a sheet, in which case the heat in the sheet was conducted away over the larger area and dissipated so rapidly that the sheet could not be brought to welding temperature before the strip was deformed.

Applicants being desirous of making articles such as type trays or cases by welding thin upstanding strips to the flat side of a sheet of metal, endeavored to have such articles made by an established welding firm, but were informed that such a process was impossible for reasons above stated. Applicants then developed the process set out in this application.

In the practice of our new process we are accustomed to weld strips of metal about an eighth of an inch thick on the side of a sheet of about the same thickness so that the strip will stand at right angles to the sheet. By welding a number of such strips on to the sheet we are able to form a case or tray for holding heavy material such as type, which case is light in proportion to its strength. It is obvious, however, that the process may be applied to the manufacture of other articles. In order to weld a strip to a sheet in the manner described we employ a special arrangement of clamps which may be used in a welding machine of standard type. Our particular clamping devices are described and claimed in our copending application filed of even date herewith.

In practising our process the metal sheet to be operated on is held in the machine in a horizontal position. The strip to be welded to the sheet is then fastened between a pair of jaws or dies which clamp the strip firmly near its lower edge and force the strip against the upper surface of the sheet. Immediately below the clamping dies in which the strip is held we employ an electrode or die which is preferably of a small upper surface and which is forced strongly against the lower surface of the sheet at the point where the weld is to be made. In this way the heat is developed at one spot only in both the sheet and the strip since the current lines are prevented from spreading out, but are localized at a point close to the lower electrode.

Figure 1:
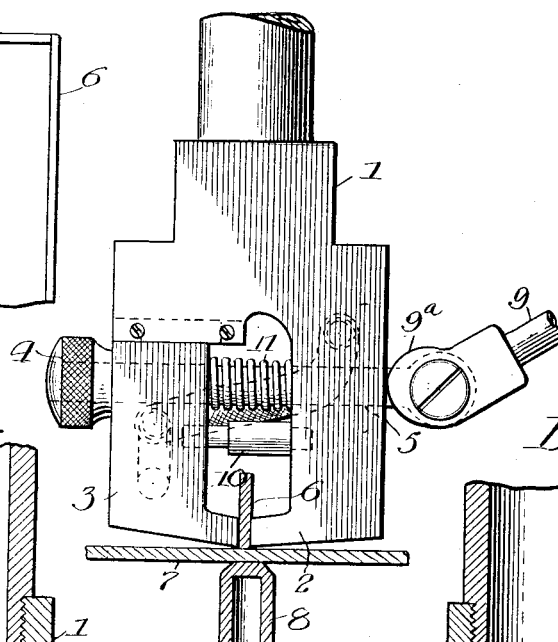
Figure 2:
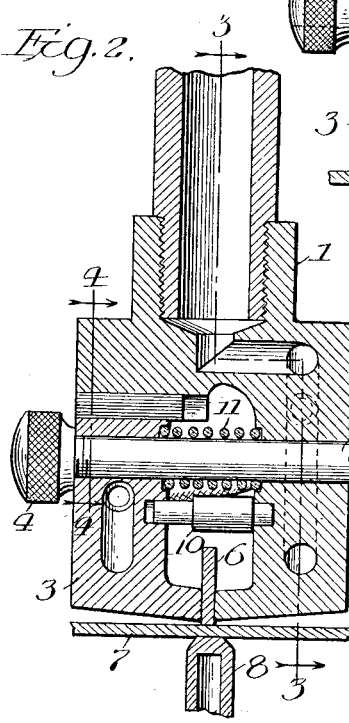
Figure 3:
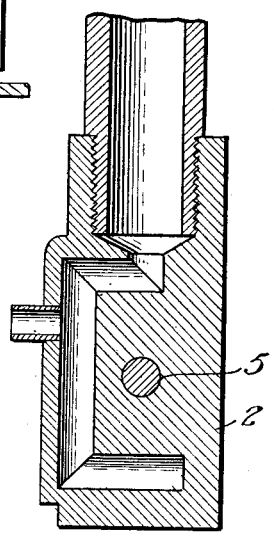
Figure 4:
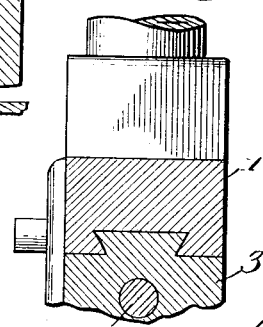

In the accompanying drawings, Figure 1 is an elevational view showing our improved apparatus and the position in which the strip and sheet are held for welding; Fig. 2 is a sectional elevational view through the center of Fig. 1; Fig. 3 is a cross section on the irregular line 3—3 of Fig. 2, looking in the direction of the arrows; Fig. 4 is a detail cross section on the line 4—4 of Fig. 2; and Fig. 5 shows a plan view of a portion of a case or tray made by our new process.

Referring more particularly to the drawings 1 represents our clamping die having a fixed jaw 2, and the movable jaw 3. 3 has a dovetail sliding engagement with the part 1, as illustrated in Figs. 2 and 4. A nut 4 or a threaded pin 5 is used to force the jaws together so as to firmly clamp the metal strip 6 which is being operated on. The position of the metal sheet 7 which is being operated on, as well as the position of the strip 6 is shown in Figs. 1 and 2. The bottom electrode or head 8 also appears in Figs. 1 and 2. This head or electrode is preferably reduced at the top so as to present a small area of contact with the face of the sheet. A lever 9 having a cam surface 9ª, is pivoted to the member 5 for forcing the jaws together and a spring 11 is coiled on bolt 5 for separating the jaws. A guiding pin 10 is also provided between the jaws 2 and 3 which prevents part 3 from being forced too close to the jaw 2, and also assists in guiding the jaw 3 in its movement. Both the jaws 2 and 3 are provided with water cooling ducts as shown, and so also is the member 8. When a weld has been made between a strip and sheet in one spot, the pieces being worked on are then moved and the same strip welded to the face of the plate in another spot. In making these welds it is not necessary to form projections of any kind on the face of the plate, or roughen, or indent it in any way. Neither does the strip require to be formed with projections or indentations on the edge to be welded, but both strip and sheet may be used just as they are formed by the ordinary rolling processes of the sheet mills.

As shown in Fig. 5 the completed article consists of a floor or base formed by a sheet 7 and comprises several compartments formed by a series of strips such as 6.

The article made by the process just described is very stiff and rigid, the strips being held firmly to the plate without other means than the welds produced. The face of the sheet opposite the strips shows small spots of approximately half an inch in diameter more or less, where the sheet has been raised to melting temperature and in some cases there is a very small indentation in the center of these welded spots due to the pressure of the lower welding head or electrode against the sheet.

It will be understood that the process can be used for making articles other than those herein set forth; also that other types or forms of apparatus can be employed, and the process carried out in other ways than those herein set forth.

Having thus described our invention, what we claim is:

1. The process of welding the straight edge of a metal strip to the face of a substantially plane plate which consists in clamping the strip with its straight edge facing the plate, supporting the plate on the side opposite said strip, forcing the edge of the strip firmly against the face of the plate, and passing an electric current through the strip and plate.

2. The process of welding an upstanding strip to the face of a plate which consists in engaging the strip on opposite sides substantially at the edge to be welded, engaging the plate substantially opposite the spot to be welded, and passing an electric current between the places of engagement.

3. The process of welding an upstanding strip to the face of a plate which consists in engaging the strip at substantially the edge to be welded, engaging a small area of the plate opposite the spot to be welded, and passing an electric current between the places of engagement.

4. The process of welding contacting metal pieces together which consists in passing the electric current between points at opposite sides of the same part of one of the pieces to be welded, and a point on the other piece substantially opposite the locus of the weld.

5. The process of welding contacting metal pieces together which consists in causing the electric current to pass between substantially the edge portion to be welded of one piece, and a point on the other piece substantially opposite the locus of the weld.

6. The process of welding contacting metal pieces together which consists in causing an electric current to flow between points or areas substantially opposite one another at the same part of the edge to be welded, and a point on the other piece substantially opposite the locus of the weld.

7. The process of welding contacting metal articles together which consists in applying electrical contact devices to opposite sides of the same part of an edge portion of one piece to be welded, applying a contact device to a point or area of the other piece to be welded substantially opposite the locus of the weld, and passing an electric current between said first mentioned contacts and said last mentioned contact.

In witness whereof, we hereunto subscribe our names this 27th day of March, A. D., 1912.

CHAS. R. MURRAY.
LEWIS R. BRINK.
WALTER K. MALMSTROM.

Witnesses:
 A. L. JONES,
 A. S. DENNISON.

---

Copies of this patent may be obtained for five cents each, by addressing the "Commissioner of Patents, Washington, D. C."